United States Patent
Mannari et al.

(10) Patent No.: US 11,262,189 B2
(45) Date of Patent: Mar. 1, 2022

(54) MONITORING CONTAINER TRANSFER DEVICE ON LOWERING CONTAINER ONTO TRANSPORT PLATFORM OR LIFTING AWAY FROM TRANSPORT PLATFORM

(71) Applicant: Konecranes Global Oy, Hyvinkää (FI)

(72) Inventors: Ville Mannari, Hyvinkää (FI); Teemu Paasikivi, Hyvinkää (FI)

(73) Assignee: Konecranes Global Oy, Hyvinkää (FI)

( * ) Notice: Subject to any disclaimer, the term of this patent is extended or adjusted under 35 U.S.C. 154(b) by 0 days.

(21) Appl. No.: 16/493,222

(22) PCT Filed: Mar. 14, 2018

(86) PCT No.: PCT/FI2018/050183
§ 371 (c)(1),
(2) Date: Sep. 11, 2019

(87) PCT Pub. No.: WO2018/167366
PCT Pub. Date: Sep. 20, 2018

(65) Prior Publication Data
US 2020/0017318 A1    Jan. 16, 2020

(30) Foreign Application Priority Data

Mar. 16, 2017   (FI) ..................... 20175236

(51) Int. Cl.
*B66C 13/46*     (2006.01)
*G01B 11/00*     (2006.01)
(Continued)

(52) U.S. Cl.
CPC ............ *G01B 11/14* (2013.01); *B65G 63/065* (2013.01); *B65G 67/02* (2013.01); *G01S 17/89* (2013.01);
(Continued)

(58) Field of Classification Search
CPC ........... G06K 9/00671; G06K 9/00791; G06K 9/6215; G06K 9/00664; G06K 9/00228;
(Continued)

(56) References Cited

U.S. PATENT DOCUMENTS

2005/0192702 A1    9/2005   Moutsokapas

FOREIGN PATENT DOCUMENTS

| CN | 101289156 A | 10/2008 |
| CN | 201198441 Y | 2/2009 |

(Continued)

OTHER PUBLICATIONS

Finnish Patent Office, Search Report, application No. 20175236, dated Oct. 13, 2017, 7 pages.

(Continued)

*Primary Examiner* — Mesfin T Asfaw
(74) *Attorney, Agent, or Firm* — Ziegler IP Law Group, LLC

(57) ABSTRACT

A method and optical detection equipment for monitoring a container transfer device on lowering a container onto or lifting away from a transport platform. The container, its pin holes' position and the position of the lock pins of the transport platform are determined by the optical detection equipment, which includes a group of optical detection devices measuring obliquely from up the container and the transport platform during lowering or lifting of the container such that positions of the container and the lock pins are determined based on the measurement of the same optical detection devices.

13 Claims, 5 Drawing Sheets

(51) Int. Cl.
| | |
|---|---|
| *G01B 11/14* | (2006.01) |
| *B65G 63/06* | (2006.01) |
| *B65G 67/02* | (2006.01) |
| *G01S 17/89* | (2020.01) |
| *B66C 13/48* | (2006.01) |
| *B66C 15/00* | (2006.01) |
| *B66C 23/62* | (2006.01) |

(52) U.S. Cl.
CPC .............. *B66C 13/46* (2013.01); *B66C 13/48* (2013.01); *B66C 15/00* (2013.01); *B66C 23/62* (2013.01)

(58) Field of Classification Search
CPC .... G06K 9/00744; G06K 9/46; G06K 9/6202; G06K 2209/01; G06K 9/0002; G06K 9/00335; G06K 9/00369; G06K 9/00624; G06K 9/00832; G06K 9/3233; G06K 9/6228; G06K 9/6276; G06K 19/06009; G06K 2009/2045; G06K 2009/3225; G06K 9/00087; G06K 9/00201; G06K 9/00248; G06K 9/00456; G06K 9/000577; G06K 9/0063; G06K 9/00751; G06K 9/00798; G06K 9/3208; G06K 9/3216; G06K 9/34; G06K 9/4604; G06K 9/52; G06K 9/6217; G06K 9/6269; G06K 9/6274; G06K 9/78; G06K 2209/19; H04W 4/029; G01B 11/14; G01S 17/06; G01S 17/89; G01S 7/497; G01S 17/42; G01S 17/48; G01S 17/894; B65G 63/065; B65G 67/02; B65G 63/004; B66C 13/46; B66C 13/48; B66C 15/00; B66C 23/62; G07C 9/00; G06T 7/0004
See application file for complete search history.

(56) References Cited

FOREIGN PATENT DOCUMENTS

| | | |
|---|---|---|
| CN | 104386582 A | 3/2015 |
| CN | 106254839 A | 12/2016 |
| CN | 205953374 U | 2/2017 |
| DE | 10212003650 A1 | 8/2013 |
| DE | 102012020953 A1 | 4/2014 |
| EP | 3000762 A1 | 3/2016 |
| EP | 3103757 A1 | 12/2016 |
| FR | 2751628 A1 | 1/1998 |
| JP | 2002241078 A | 8/2002 |
| JP | 2014237528 A | 12/2014 |
| WO | 2012152984 A1 | 11/2012 |
| WO | 2013076366 A1 | 5/2013 |
| WO | 2015022001 A1 | 2/2015 |
| WO | 2016001481 A1 | 1/2016 |
| WO | 2016156667 A1 | 10/2016 |

OTHER PUBLICATIONS

Haanpaa, Doug et al., 'Machine Vision Algorithms for Robust Pallet Engagement and Stacking'. In: Proceedings of the 2016 IEEE Applied Imagery Pattern Recognition Workshop (AIPR), Oct. 18-20, 2016, Washington, DC, USA. IEEE, 2016.
International Search Report and Written Opinion of the Searching Authority, Application No. PCT/FI2018/050183, dated Jun. 21, 2018, 8 pages.
International Preliminary Report on Patentability, Application No. PCT/FI2018/050183, dated Jun. 26, 2019, 28 pages.
Written Opinion of the International Searching Authority, Application No. PCT/FI2018/050183, dated Jun. 21, 2018, 8 pages.

MONITORING CONTAINER TRANSFER DEVICE ON LOWERING CONTAINER ONTO TRANSPORT PLATFORM OR LIFTING AWAY FROM TRANSPORT PLATFORM

TECHNICAL FIELD

The aspects of the disclosed embodiments generally relate to a monitoring container transfer device on lowering a container onto a transport platform or lifting away from the transport platform.

BACKGROUND ART

This section illustrates useful background information without admission of any technique described herein representative of the state of the art.

A container crane grabs a container by a spreader that attaches to corner fittings on top of a roof of a container (more specifically, to the pin holes thereof) typically with machine operated locking pins. Correspondingly, a container is guided to a transport platform such that the corner fittings underneath the container align with lock pins that are in the transport platform and that attach a container to the transport platform. The transport platform can be e.g. in a car of a train or a rubber wheel equipped transport device such as a trailer of a truck or a lorry.

Releasing a container automatically onto the transport platform requires accurate positioning of a container onto the transport platform. In practice, the transport platform can be supports set at at least some of edge-enforced portions of a container on a vendor-specifically implemented beam body. Hence, the dimensions of the transport platform vary in relation to the corner fittings of the container and for parking a container, the lock pins need to be detected.

WO2012152984A1 describes a system for determining the position of a container position in a vehicle to be loaded with containers and/or its trailer. In the publication, there is installed a laser scanner to a fixed structure next to each lane such that the position of a vehicle parked on a lane and/or the position of lock pins of the vehicle would be determined with the laser scanner. Alternatively, one laser scanner is arranged to determine the positions of lock pins of vehicles parked on 1 to 4 lanes and/or of the trailers of the vehicles, when at least two lock pins of each vehicle or trailer to be loaded are turned to be visible for each container to be loaded. In the publication, a known laser scanner position in relation to ground and home field co-ordinates is employed. The crane is equipped with a positioning system that detects the position of the crane in relation to the home field co-ordinates and on the other hand the position of the spreader in relation to the crane. Position information determined by the laser scanner is relayed to the crane and a positioning system of the crane calculates, based on the position information of the spreader, the position of the lock pin in relation to the crane.

In automatic loading of containers onto a transport platform, it is very important as well for safety reasons as for efficiency of container handling. Errors easily cause both direct and indirect damage caused by the time taken for resolving error situations.

The aspects of the disclosed embodiments are directed to improving the efficiency of container handling in loading containers onto the transport platform and/or unloading from the transport platform, or to at least provide new technology as an alternative to known solutions.

SUMMARY

According to a first example aspect of the disclosed embodiments there is provided a method for monitoring a container transfer device on lowering a container onto a transport platform, comprising automatically:

monitoring by optical detection equipment a measurement zone defined by one or more beams, which measurement zone comprises at least two locking pins of a transport platform at a loading place and space above the transport platform;

detecting by the same optical detection equipment:
a position of the locking pins; and
a position of a container at the measurement zone; the method comprising:

determining, based on the detected position of the lock pins and based on the detected position of the container, a relative position of pin holes of the container and the lock pins of the transport platform.

Based on relative position of the pin holes and lock pins of the transport platform, the container transfer device may correspondingly be automatically controlled to transfer the container onto the transport platform aligning the pin holes with the lock pins.

The transport platform may be a transport platform of a land transport vehicle. The land transport vehicle may be a train car or a rubber tired transport means, such as a trailer, truck or lorry.

Preferably, the same optical detection equipment may detect both the position of the lock pins that define a target place such that optical devices of the optical detection equipment need not be focused and directed separately with the own positioning system of the lifting device. Preferably, relative position of the container and the lock pins is detected using the optical detection equipment on lowering a container onto the transport platform. Preferably, using same optical detection equipment may achieve an advantage that mutual calibration need of the measurement arrangement substantially reduces, when the container and lock pins of the transport platform are visible in the same measurement zone. Reducing or entirely removing of calibration facilitate working, as accurate positioning of sensors and measuring the accurate position thereof is removed. It should be appreciated that in a known technique, the sensor or sensors may have resided over ten meters away from each other or from a parking system of a crane, and further they may have been in a height of several meters. Hence, e.g. the use of person lifts may be avoided in installation or service, which is advantageous particularly in ports, where movement of extra vehicles or people is restricted.

According to a second aspect of the disclosed embodiments, there is provided a method for monitoring a transfer device on lifting a container away from the transport platform, comprising automatically:

monitoring by an optical detection equipment a measurement zone defined by one or more beams, which measurement zone comprises at least two locking pins of a transport platform at a loading place and space above the transport platform;

detecting by the optical detection equipment an initial position of the container before removal of the container from the transport platform;

determining, based on the initial position of the container, an initial position of lock pins of the transport platform which correspond to the pin holes of the container;

verifying using the optical detection equipment that said lock pins in question become visible underneath the container as an indication that the lock pins of the transport platform, which correspond to the pin holes of the container, do detach from the pin holes of the container.

The lifting of the container may be automatically interrupted if said verifying fails.

Preferably, same optical detection devices may detect the position of the container and verify that the container has detached from the transport platform before the lifting is continued.

Preferably, the lifting of the container from the transport platform may be automatically interrupted unless during progress of the lifting the optical detection equipment detects the lock pins of the transport platform. Preferably, an error situation may be detected by using the optical detection equipment, in which error situation the container is not released from all the lock pins of the transport platform. Preferably, distancing of the container from the transport platform is detected before the container has been lifted by 0.2 m, 0.5 m, 0.8 m or 1 m.

The lifting of the container may be interrupted unless the lock pins of a long side closer to the optical detection equipment become visible on lifting the container by a first distance and unless the lock pins of the long side farther away from the optical detection equipment become visible on lifting the container by a second distance. The proportion of the second distance to the first distance may depend on mounting height of the optical detection equipment and on lateral distance from the lock pins of more distant long side.

In this document, longitudinal direction refers to a direction along the length of the transport platform and vehicle in horizontal direction and sideways direction refers to a horizontal direction perpendicular to that of the longitudinal direction. A lateral direction refers to a horizontal direction in longitudinal and/or sideways direction.

In measuring the lifting distance, information about vertical transfer distance of the container may be utilized, which information is received from a container transfer device or its part such as hoisting motor.

The vertical transfer distance may be compared or used as a parallel information for verifying the lifting or lowering of the container. Additionally, so obtained information may be utilized in for a difference measure of different optical sensors in different lifting places and/or for doing other mutual calibration or comparison of measurement data or verification information relating to lifting/lowering may be verified e.g. for self-diagnostics.

The optical detection equipment may comprise one or more optical detection equipment, which may be mutually similar or different. The optical detection device may be chosen from a group formed by: a camera; a 3D-camera, A Time Of Flight (TOF)—camera; a stereo camera; a laser triangulation device; and a laser scanner.

The optical detection equipment may be fixedly mounted. The optical detection equipment may be fixedly mounted such that a centerline of the measurement zone resides obliquely downwards from the optical measurement equipment, for example more in a horizontal than in vertical direction. The centerline of the measurement zone may be in an angle of less than 20, 25, 30, 35, or 40 degrees from horizontal direction.

Preferably, the optical detection equipment may be mounted in e.g. relatively low poles, a body of a crane or other structure e.g. at a height of 1.5 to 3 m, such as 2 m or 2.5 m height such that the mounting can be made easily and safely without machine operated lifting devices or tall construction cradles.

The optical detection equipment may comprise detection devices on one or more lanes at one or more loading positions. The loading positions may reside at a pitch of one container length.

The optical detection equipment may comprise one camera for detecting the position of the lock pins at a first end of the transport platform and another camera at another end of the transport platform for detecting the position of the lock pins.

Preferably, the optical detection equipment may form a discontinuous measurement zone with two or more optical detection devices such that at a region of the lock pins and container ends, there may be formed an accurate detection area and a less interesting central region for controlling the container may be left entirely outside the measurement zone and unnecessary processing load may be avoided. Positions of different parts of the discontinuous measurement zone may be determined by moving linearly and with constant speed a container or e.g. a van across the measurement zones and by measuring when an arriving and departing ends of the object being followed arrives to each part of the measurement zone and at which height the object is at each part of the measurement zone in relation to the respective optical detection device. Preferably, relationship of each part of the measurement zone may be determined at the same time in relation to the positioning system of the container transfer device.

The position of the lock pins may be detected in relation to the measurement zone. The position of the container may be detected in relation to the measurement zone.

The position of the lock pins may refer to a position of the lock pins as a group for determining a loading position for the container.

The measurement zone may be a three-dimensional measurement space. In the method, a position of the measurement space may further be determined in relation to an origin of the container handling system. The position of the measurement space in relation to the origin of the container handling system may be set by bringing a container into the measurement space and by simultaneously determining the position of the container by positioning of the container handling system and with the optical detection equipment and by calculating correspondence of the determined position. The position of the measurement space in relation to the origin of the container handling system may be set on taking the optical detection equipment in use. The position of the measurement space in relation to the origin of the container handling system may be set again or checked automatically on guiding a container onto the transport platform or out of it to compensate possible changes of optical detection equipment.

Preferably, the measurement zone may be easily and quickly targeted on mounting or after the optical measurement device has moved e.g. due to having been bruised without necessarily need to carefully arrange the measurement device in place.

In an embodiment, on loading a container:
the position of the lock pins is detected using the optical detection equipment; and
the container transfer device is controlled to bring the container to the measurement zone before said determining occurs for the relative position of the container pin holes and the lock pins of the transport platform based on the detected position of the lock pins and the detected position of the container.

Preferably, the position of a transport platform brought to the loading area may be automatically detected and the container transfer device may be guided that close to the loading target that the fine adjustment of container may be implemented using a fine adjustment equipment of the container transfer device.

According to an aspect of the disclosed embodiments there is provided a method for automatically guiding containers to a transport platform and out of the transport platform. The container, the position of its pin holes and the position of lock pins of the transport platform are determined using an optical detection equipment that comprises a group of optical detection devices that measure the container and the transport platform from obliquely up during lowering or lifting of a container such that based on the same optical detection devices the positions of the container and the lock pins are determined.

According to an embodiment there is provided an optical detection equipment for monitoring a container transfer device, the optical detection equipment comprising: one or more optical detection devices; at least one processor; and computer program code, characterized in that the computer program code is arranged to cause, when said at least one processor executes the program code that a method of any previous aspect is performed.

The container transfer device may be a container crane. The container crane may be a ship-to-shore (STS) crane, a moving portal crane, such as a rail mounted gantry crane (RMG), a rubber tired gantry crane (RTG), an automatic stacking crane (ASC).

Different embodiments of the present disclosure are described or have been described only in connection with some aspect or aspects. A person skilled appreciates that any embodiment of one aspect can be implemented in the same or other aspects alone or in conjunction with other embodiments.

BRIEF DESCRIPTION OF THE DRAWINGS

The aspects of the disclosed embodiments will now be described by means of example with reference to the accompanying drawings.

DETAILED DESCRIPTION

In the following description, like reference signs denote like elements or steps. It should be noticed that the drawings are not entirely in scale and that they primarily serve to illustrate various embodiments of the present disclosure.

Figure 1:
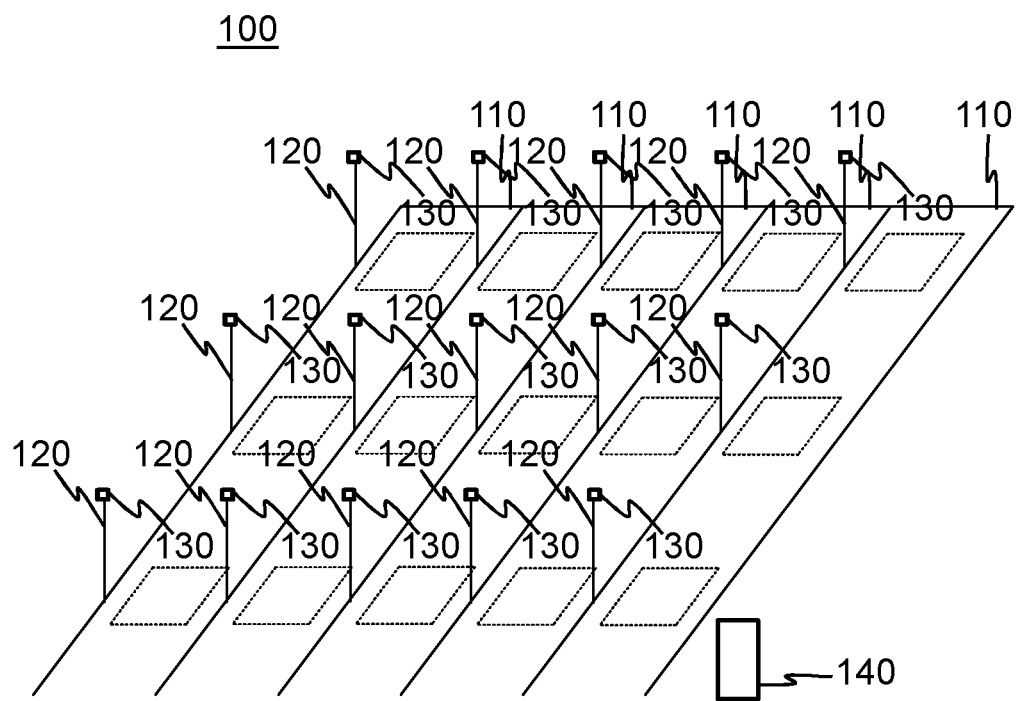
FIG. 1 presents a schematic drawing of an optical detection equipment of an embodiment of the invention in relation to lanes of an automatic stacking crane.

FIG. 1 presents a schematic drawing of an optical detection equipment 100 of an embodiment of the invention in relation to lanes 110 of an automatic stacking crane. The optical detection equipment 100 comprises, mounted next to the lanes 110, a group of poles to heads of which optical detection devices 130 have been mounted. Additionally, the optical detection equipment 100 comprises a controller 140 that is a communication connection with the optical detection devices 130 and a control system (not shown) of the crane.

Figure 2:
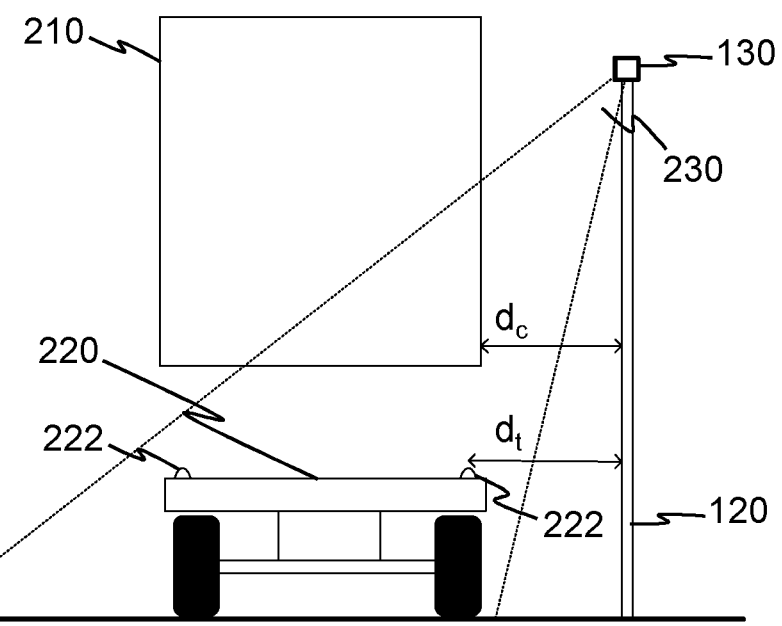
FIG. 2 presents, in direction of a lane, an implementation of positioning optical detection devices and a measurement zone according to an embodiment.

FIG. 2 presents, in direction of the lane 110, an implementation of positioning optical detection devices 130 and beams 230 according to an embodiment of the invention. FIG. 2 also shows a container 210, a transport platform 220 underneath a container and a lock pin of the transport platform, for example a lock pin suited for ISO containers (twist lock).

FIG. 2 shows a pole 120 drawn vertically and horizontal distances $d_c$, drawn in relation to the optical detection device 130, to a side of the container 210 (long edge on side of the optical detection device 130) and $d_t$ to a centerline of the lock pin 222 (on the side of the optical detection device 130). In the situation drawn in FIG. 2, the optical detection device 130 cannot yet observe the more distant lock pin 222, because it is left behind a bottom part of the container 210.

Figure 3:
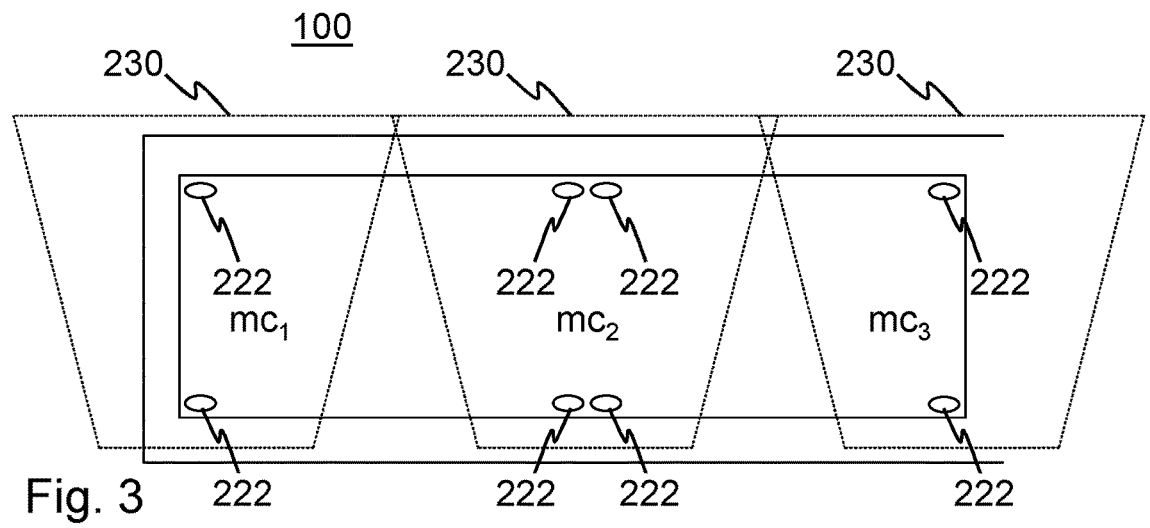
FIG. 3 presents view areas of optical detection devices in relation to a container position on a transport platform in a lane of FIG. 1 according to an embodiment of the present disclosure in which optical detection devices are mounted to poles.
Figure 4:
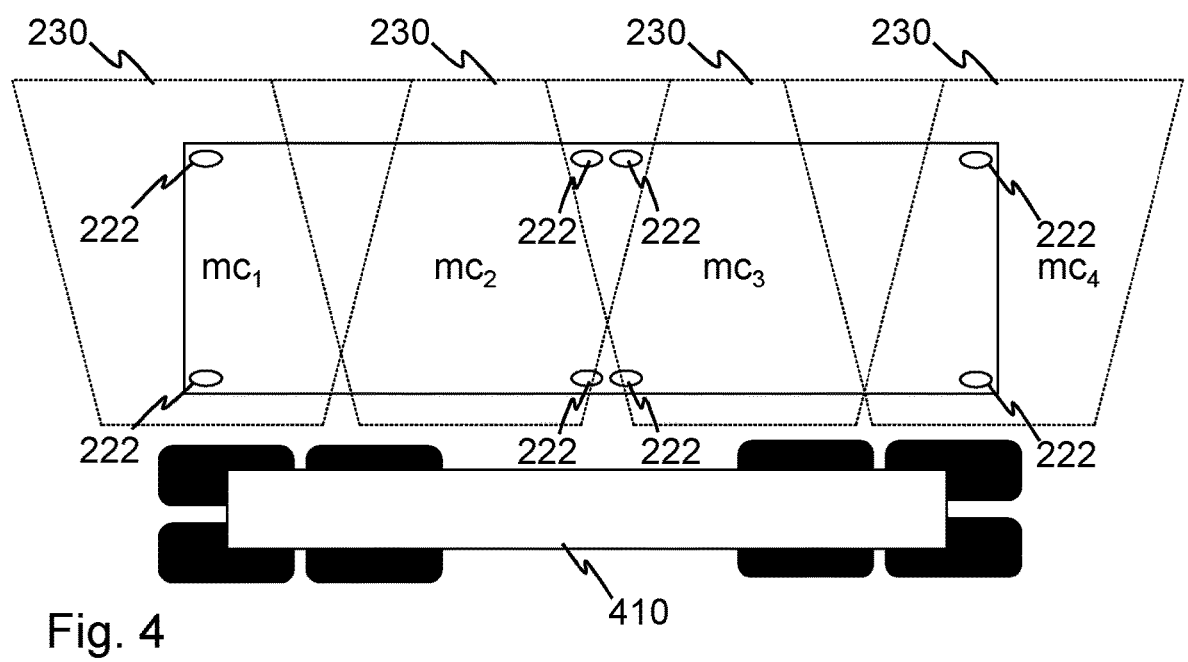
FIG. 4 presents view areas of optical detection devices in relation to a container position on a transport platform in a lane of FIG. 1 according to an embodiment of the present disclosure in which optical detection devices are mounted to a body of a crane.

The pole of FIG. 2 is advantageous to install vertically from the point of view of the stress, but it can also be oblique e.g. towards the lane or in direction of the lane without disturbance on operation according to various embodiments of the invention. FIGS. 3 and 4 further illustrate that how the distance between the poles 120 and the direction of the optical detection devices 130 is not necessarily constant. This causes significant advantages from the point of view of mounting and maintenance.

FIGS. 3 and 4 present two different embodiments view ranges 230 of the optical detection devices 130 in relation to a place of a container 210 on the transport platform 220 on the lane 110. In FIG. 3, the optical detection devices 130 have been mounted fixedly next to the lane 110, e.g. to poles. In FIG. 4, the optical detection devices have been mounted to a body 410 of a crane (e.g. an RTG crane). In the embodiment of FIG. 3, the beams 230 are overlapping only behind the rear side of the container i.e. on the view ranges of the beams, there are gaps at the container 210. FIG. 3 further shows that the first and second beams 230 i.e. $mc_1$, $mc_2$ intersect at a slightly different point that the second and third beams $mc_2$, $mc_3$. In FIG. 4, on the other hand, the third and fourth beams $mc_3$, $mc_4$ form a uniform coverage on the line of the lock pins 222 also on the side of the optical detection devices 230, whereas in two other lines drawn in FIG. 4, there is a discontinuity in the seam of the drawn beams on the side of front most lock pins line.

It should be noted for clarity, that the beams of FIGS. 3 and 4 are drawn in the plane of one transport platform.

Figure 5:
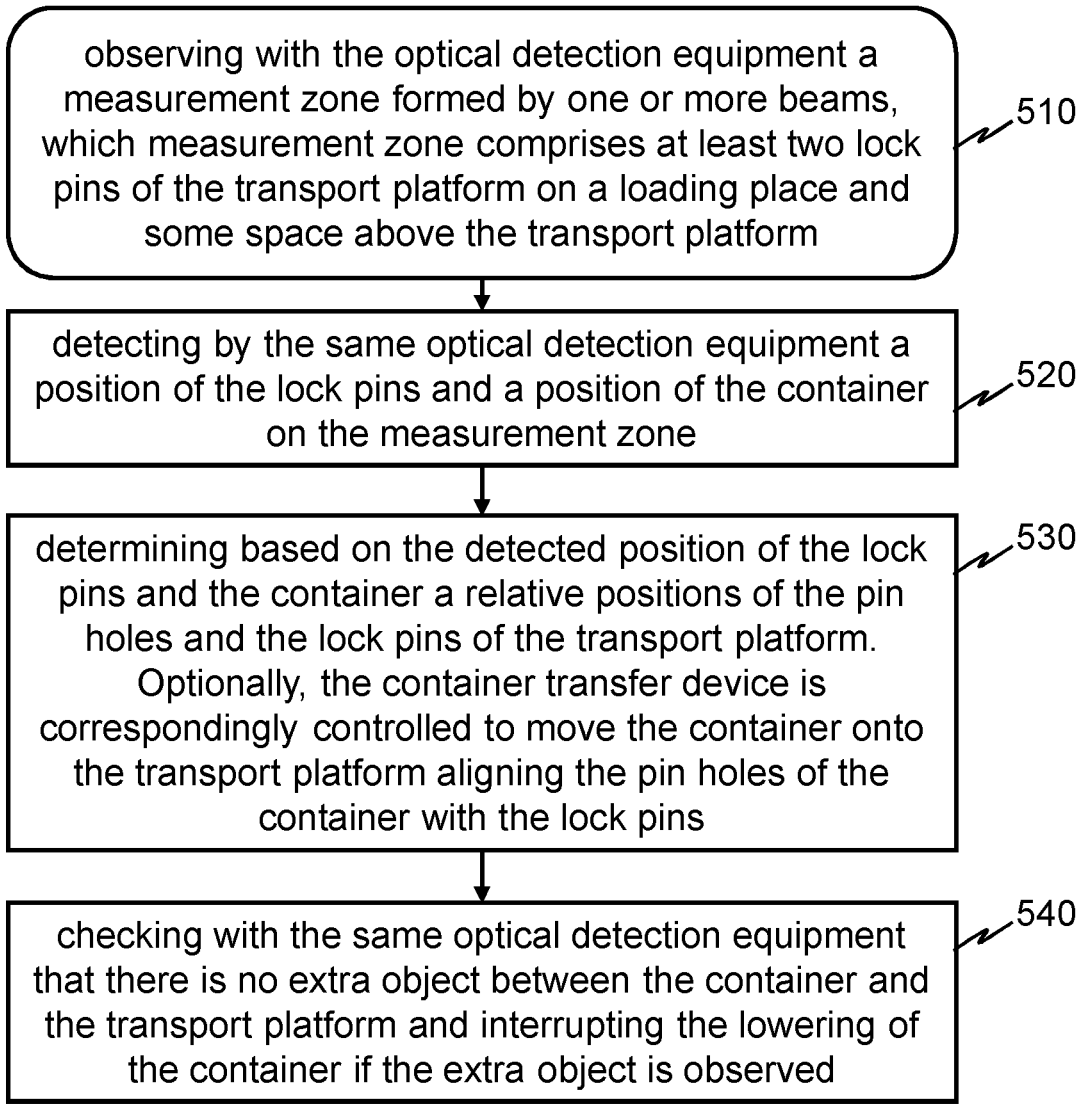
FIG. 5 presents a flow chart of a method for guiding a container for lowering the container according to an embodiment of the present disclosure.

Operation of some embodiments is next described. FIG. 5 presents a flow chart of a method according to an embodiment of the present disclosure controlling a container transfer device on lowering a container 210, which method comprises automatically:

510. observing with the optical detection equipment 100 a measurement zone ($mc_1$ ... $mc_4$) formed by one or more beams 230, which measurement zone comprises at least two lock pins 222 of the transport platform 220 on a loading place and some space above the transport platform 220;

520. detecting by the same optical detection equipment:
   the position of the lock pins 222;
   the position of the container 210 on the measurement zone; and the method comprising:

530. determining based on the detected position of the lock pins 222 and the container 210 a relative positions of the pin holes 810 (FIG. 8) and the lock pins 222 of the transport platform 220. Optionally, the container transfer device is correspondingly controlled to move the container 210 onto the transport platform 220 aligning the pin holes 810 of the container 210 with the lock pins 222; and 540. checking with the same optical detection equipment 100 that there is no extra object between the container 210 and the transport platform 220 and interrupting the lowering of the container 210 if the extra object is observed.

In this connection, the beam refers to a measurement space of the optical measurement device 130 i.e. that space that the optical detection devices 130 of the optical detection system 100 can observe.

Before the process of FIG. 5, the container 210 is transferred preferably automatically to the measurement zone ($mc_1$ ... $mc_4$). For this automatic transfer, the crane positioning system and prior knowledge of a rough position of the transport platform 220 may be used so that the container 210 can be transferred to the measurement zone ($mc_1$ ... $mc_4$) for automatic docking to the transport platform 220.

Figure 6:
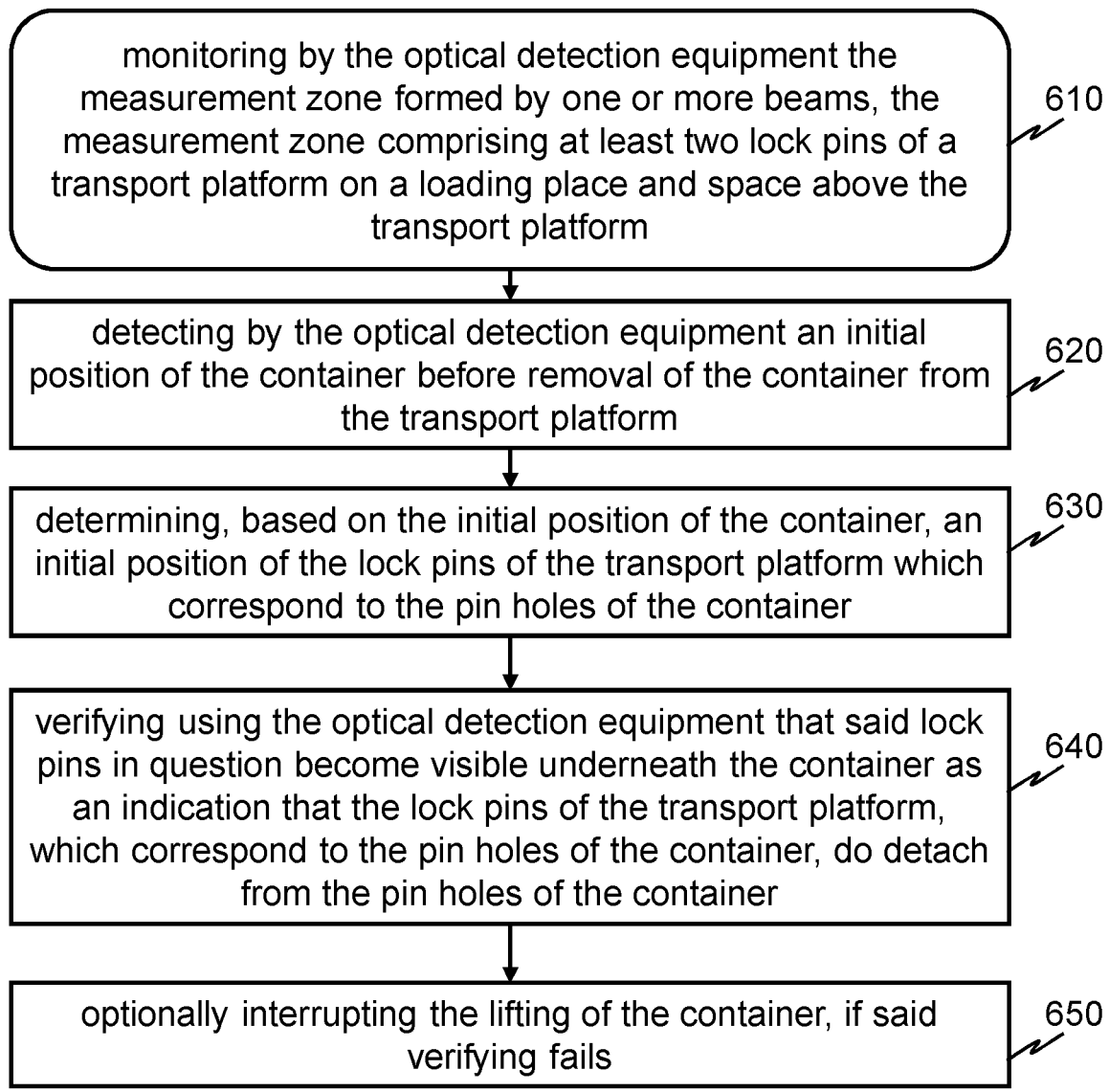
FIG. 6 presents a flow chart of a method for guiding a container for lifting the container according to an embodiment of the present disclosure.

FIG. 6 presents a flow chart of a method for guiding a container 210 for controlling lifting of the container 210 away from the transport platform 220 according to an embodiment of the present disclosure, comprising automatically:

610. monitoring by the optical detection equipment the measurement zone formed by one or more beams 230, the measurement zone comprising at least two lock pins 222 of a transport platform 220 on a loading place and space above the transport platform 220;

620. detecting by the optical detection equipment 100 an initial position of the container 210 before removal of the container 210 from the transport platform 220;

630. determining, based on the initial position of the container 210, an initial position of the lock pins 222 of the transport platform 220 which correspond to the pin holes 810 of the container 210;

640. verifying using the optical detection equipment 100 that said lock pins 222 in question become visible underneath the container 210 as an indication that the lock pins 222 of the transport platform 220, which correspond to the pin holes 810 of the container 210, do detach from the pin holes 810 of the container. Optionally, the method further comprises:

650. interrupting the lifting of the container, if said verifying fails.

As an advantage of the embodiments of FIGS. 1 and 2, it is possible to detect the position of the container 210 and verify that the container 210 has detached from the transport platform 220 before the lifting is continued using the same optical detection devices 130. For example, the lifting of the container 210 can be automatically interrupted, unless the lock pins 222 of the transport platform 220 are not observed while the lifting progresses.

In an embodiment, the lifting of the container 210 is interrupted unless the lock pins 222 of a long side closer to the optical detection equipment 100 become visible on lifting the container 210 by a first distance and unless the lock pins 222 of the long side farther away from the optical detection equipment 100 become visible on lifting the container 210 by a second distance. The proportion of the second distance to the first distance may depend on mounting height of the optical detection equipment 100 and on lateral distance from the lock pins 222 of more distant long side.

As presented in FIGS. 1 and 2, the optical detection equipment 100 can be fixedly mounted. The centerline of the optical detection equipment 100 measurement zone can be set to reside obliquely downwards from the optical detection equipment 100, e.g. more in the horizontal than vertical direction. The centerline of the measurement zone can be under 20, 25, 30, 35, or 40 degrees angle from the horizontal direction. The mounting can also be semi-fixed, as the aspects of the disclosed embodiments do not necessitate accurate setting of the measurement zones. Poles sufficient for a relatively low mounting can be implemented e.g. with steel pipes fixed to an ordinary passenger car wheel, with the optical detection devices 130 and solar cells and batteries at the heads of which pipes are in a light unit that enables wireless installation simply by distributing such semi-rigid detection stations next to the lanes 110 approximately directed towards the lanes 110. Namely, as an advantage of the embodiments described in the foregoing, the same optical detection device 130 is used for detecting both the container 210 and the lock pin 222 and thus a need is avoided to set the beams of the detection devices 130 according to a predetermined model.

In an embodiment, the optical detection equipment 100 may comprise one camera at a first end of the transport platform 220 for detecting the position of the lock pins at that end and another camera at another end of the transport platform 220 for detecting the position of the lock pins 222 at that end. For detecting half-length containers, there is preferably a third optical detection device 130 at about halfway of a full-length container or there are more than three optical detection devices 130.

As described in connection with FIGS. 3 and 4, the optical detection equipment may form a discontinuous measurement zone with two or more optical detection devices 130. Then, a sharp detection zone may be formed at an area at the lock pins 222 and the ends of the container 210. The less interesting central region, from the point of view of guiding the container 210, can be even entirely excluded from the measurement zone. This may reduce processing load.

In connection with taking into use of the optical detection equipment and in case of possible changes occurring (e.g. change of detection device 130 or bending of the pole), the calibration is usually doable quickly and simply e.g. using embodiments that will be next described.

The positions of different parts the discontinuous measurement zone may be determined e.g. by moving linearly and with constant speed a container 210 or e.g. a van across the measurement zones and by following that when an arriving and departing ends of the object being followed arrives to each part of the measurement zone and at which height the object is at each part of the measurement zone in relation to the respective optical detection device. Preferably, relationship of each part of the measurement zone may be determined at the same time in relation to the positioning system of the container transfer device. As an accessory for such a calibration e.g. a white van can be used, to the side of which there is taped horizontal and vertical dark tapes e.g. in case of using stereo cameras or laser triangulation. In case of the latter, the cameras used for triangulation detect the calibration object (e.g. van or container) moving to their beam and the images obtained from the cameras are compared and the relationship of the camera beams to each other is determined. In result of the comparison, the positions of the beams in relation to each other can be detected e.g. using autocorrelation. At the same time, the measurement zone can be defined.

The defining of the measurement zone can be further specified using shapes appearing in the beams, such as a lane line, fence or horizon. The defining of the measurement zone may be implemented also e.g. by imaging an empty transport platform 220 stopped at different loading positions, with the lock pins 222 visible, and by detecting the points of the lock pins 222. After this detection, it can be determined trigonometrically, based on the difference of angles occurred in the detection of the lock pins 222, the distance and height of each optical detection device 130 in relation to the transport platform 220 making use of known arrangement of the lock pins 222 (known rectangular shape and distances).

In result of the calibration, the measurement zone may be a three-dimensional measurement space. Additionally, for facilitating automatic container handling, a position of the measurement space may further be determined in relation to an origin of the container handling system. In the automatic container handling systems, the position of the spreader should be known on leaving the container 210 and preferably the position defined by the optical detection equipment 100 is determined also in relation to the origin of the automatic container handling system.

The position of the measurement space in relation to the origin of the container handling system may be defined by bringing a container into the measurement space and by simultaneously determining the position of the container by positioning of the container handling system and with the optical detection equipment and by calculating correspondence of the determined positions. Determining of combining of the co-ordinate systems of the optical detection equipment 100 and the container handling system can be done on take into use of the optical detection equipment. The position of the measurement zone in relation to the origin of the container handling system can be set again or be checked automatically always or sometimes on guiding a container to the transport platform 220 or away from it to compensate for possible changes in the optical detection equipment 100.

On loading the container 210, according to an embodiment:
the position of the lock pins 222 is detected using the optical detection equipment 100; and
the container transfer device is controlled to bring the container 210 to the measurement zone before said determining occurs for the relative positions of the container pin holes and the lock pins of the transport platform based on the detected position of the lock pins and the detected position of the container.

A new container 210 can be brought to its loading place e.g. such that a truck or train coach is brought along the lane 110. The moving ahead of the incoming container 210 or containers 210 is monitored with the optical detection equipment 100 and the incoming transport platforms 220 are guided to be stopped such that as many as possible of the arrived transport platforms 220 are at a measurement zone at lock pins 222. For this purpose, signs controllable by the optical detection equipment 100 can be used, such as a signal light "forward", "stop" and "backwards". All the lock pins 222 are cannot necessary necessarily be got to the measurement zone, for example because of discontinuities of the measurement zone or if on the lane 110 there comes a longer group of containers when measured at the lock pins 222. If necessary, those of the containers 210 can be first automatically removed the lock pins 222 of which are on the measurement zone and then the transfer of the remaining containers 210 can be so guided that more containers 210 can be automatically removed.

Transferring of the transport platforms 220 can be done e.g. by giving the signs described in the foregoing to a driver of a vehicle transferring the transport platforms 220 or by issuing corresponding commands directly to the vehicle in case of an automatically controllable vehicle. In case of a robot truck or train, required control can be formed e.g. before bringing the vehicle to the lane 110 or after the vehicle has arrived to the lane 110. In a transition phase, robot trucks can be implemented with local automatic control to a limited extent e.g. by connecting a local control device via an OBD or corresponding data transfer port and by controlling the vehicle via the local control device to move e.g. with the steering left straight or by also controlling the vehicle using e.g. electric assistance steering system provided for a lane-keeping assistant.

When the container 210 or containers 210 have been got to the loading area (e.g. on a lane 110), the position of a transport platform 220 brought to the loading area is preferably automatically detected and the container transfer device is then guided that close to the loading target that the fine adjustment of container 210 can be implemented using a fine adjustment equipment of the container transfer device. The fine adjustment equipment of the container transfer device may comprise, for example, guide members affecting to wires supporting the spreader, such as wires or booms.

Figure 7:
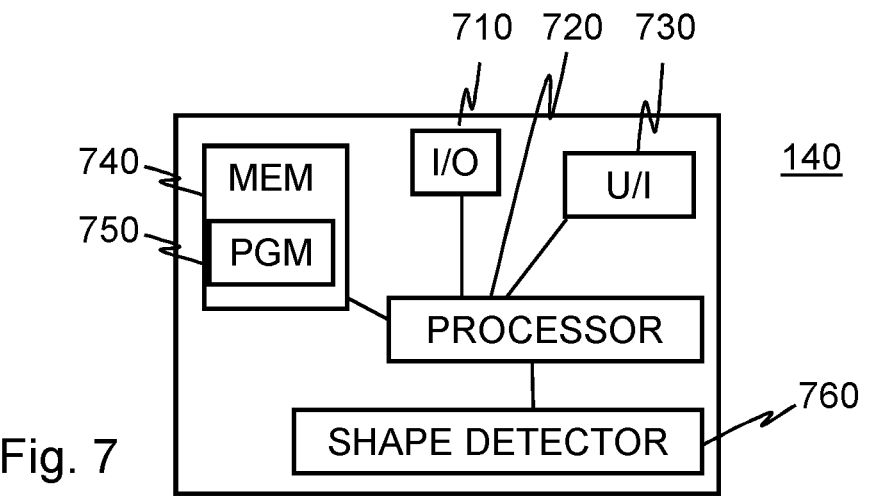
FIG. 7 presents a simplified block diagram of a container control device according to an embodiment of the present disclosure.

FIG. 7 presents a simplified block diagram of a container control device 140 according to an embodiment of the invention. The control device 140 comprises a data transfer circuit 710 e.g. for digital data transfer with a container transfer system and with the optical detection equipment 100. The control device 140 comprises at least one processor 720, possibly a local user interface 730 and a memory 740 and computer program code 750. By executing the computer program code 750 with the at least one processor 720, the control device 140 implements according to the program code embodiments of the invention according to which the control device 140 is arranged to operate. The control device 140 may further comprise a dedicated shape recognizer 760 e.g. for detecting the lock pins 222 and possible foreign objects. The shape recognizer may comprise e.g. a processor, memory and computer program code.

Communication is performed with the data transfer circuit 710 possibly also with the container transfer device such as a crane. In this case, information received from the container transfer device or its part, e.g. crane hoisting motor, about vertical transfer distance of a container 210, can be used for measuring the lifting distance. The vertical transfer distance can be compared or used as a parallel information for verifying container 210 lifting or lowering. For example, on lifting or lowering a container 210, corresponding movement should be optically detected as it can be deduced based on the information received from the transfer device that the container 210 has moved. Additionally, information received in this other way can be used for difference measure of different optical sensors in different lifting positions. Additionally or alternatively, other mutual calibration can be performed or for comparison of other verification information can be verified e.g. for self-diagnostics. For example, vertical movement information of a container 210 received from the transfer device can be used for calibrating the operation of the optical detection system 100. This may be particularly useful e.g. therefore that the mounting height of the optical detection devices 130 may vary. Also the height of the transport platform 220 may vary vehicle specifically. Information received from the transfer device can be made use of e.g. as a coarse initial information e.g. for calibrating the optical detection equipment 100. Correspondingly, information given by the optical detection equipment 100 can be used for calibrating the transfer distance of the container 210.

Figure 8:
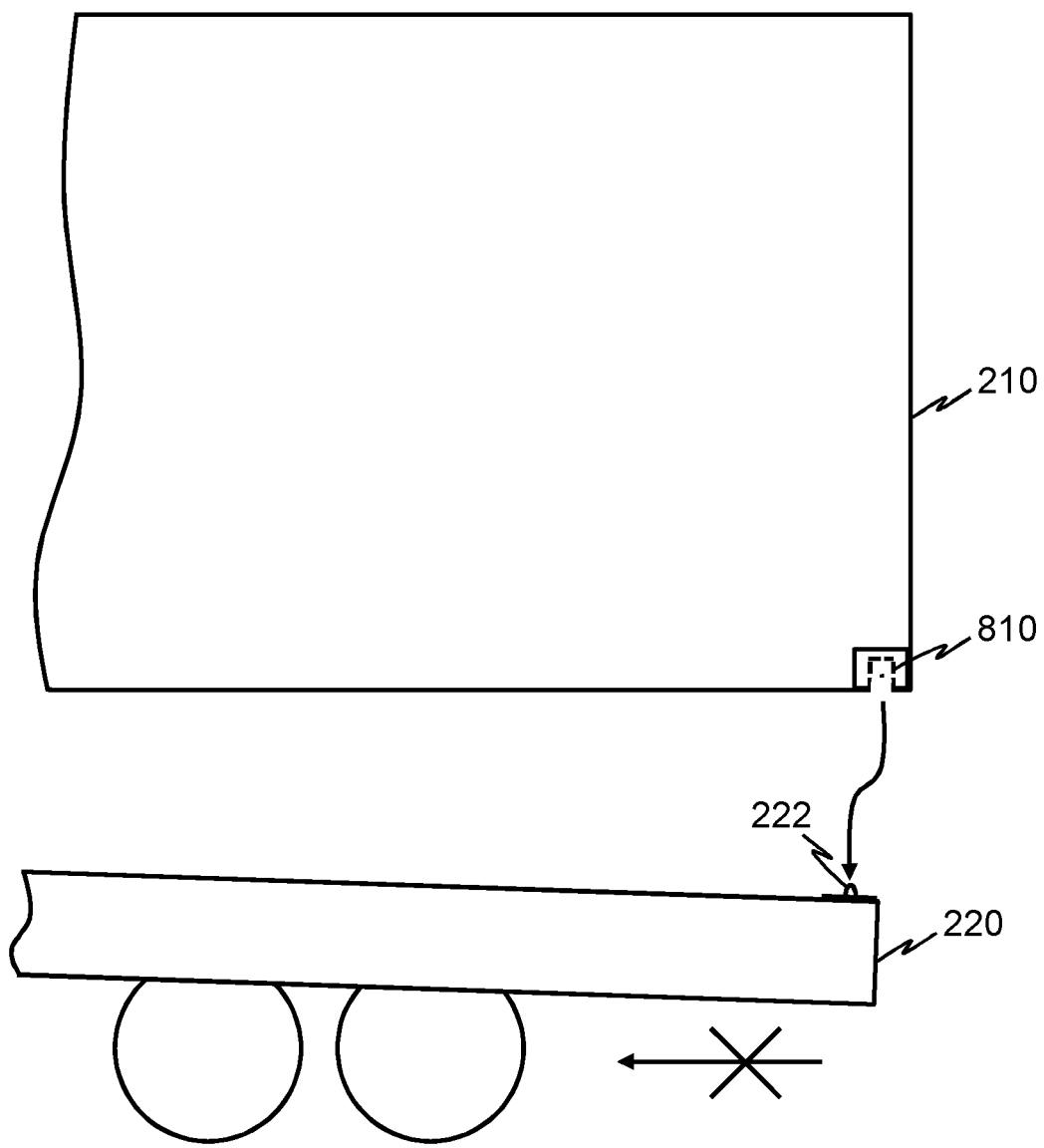
FIG. 8 presents a container to be lowered down onto a transport platform, particularly a rear portion, when the intended departure direction of the vehicle is forward in the longitudinal direction (to the left-hand side in the drawing).

FIG. 8 presents a container 210 to be lowered down onto the transport platform 220, particularly a rear portion, when the intended departure direction of the vehicle is forward in the longitudinal direction (to the left-hand side in the drawing).

In an embodiment, the optical detection equipment 100 follows the descent of the container 210 down onto the transport platform 220. The optical detection equipment may simultaneously follow that the transport platform 220 remains substantially immobile in the longitudinal direction relative to its environment (e.g. the transport platform 220 does not move over 5 mm, over 10 mm, over 20 mm, over 30 mm, over 40 mm or over 50 mm). According to FIG. 8, the container 210 is lowered substantially vertically. Substantially vertically refers to that the container moves downwards while the crane lowers down the container 210, and based on measurement generally small lateral correction movements can be made so that the pin holes 810 of the container 210 get laterally aligned i.e. on a substantially same vertical line.

Simultaneously with lowering down of the container 210 it may be monitored using the measurement in the measurement zone that the transport platform 220 does not move longitudinally, according to FIG. 8. Practically thus the vehicle is not allowed to begin moving forwards or backwards in the longitudinal direction of the vehicle and the driver must not move the vehicle and the vehicle must not begin to move by itself after the driver has exited e.g. by freely moving downhill. This monitoring of staying in place can be implemented by following the position of the lock pins 222 of the transport platform 220, as on the measurement zone the approaching of the container's 210 pin holes 810 from upwards is followed i.e. when docking of the container 210 to the transport platform 220 takes place. Preferably, with the same optical detection devices 130 the position of the lock pins 222 is followed for the docking and the staying immobile of the transport platform 220 for the container 210 docking with sufficient accuracy (e.g. 5 mm, 10 mm, 15 mm or 20 mm).

By longitudinal or sideways movement of the transport platform 220 in is not referred herein to that on the container 210 approaching a first contact to the transport platform 220, the transport platform is slightly pressed downwards and possibly also slightly to a side and/or forwards and/or backwards, particularly when lowered onto a rubber tired transport platform 220. In the driving direction of the transport platform 220, the forward edge of the transport platform is usually slightly higher than its rear edge according to FIG. 8, and inter alia. For this reason, a slight horizontal movement is possible. Also tire pressures and condition of the tires of the transport platforms 220 may vary and cause slight sideways movement of the transport platform 220 on lowering down the container 210.

According to an embodiment, it is monitored on docking together the container 210 and the transport platform 220 that in the (substantially horizontal) gap between the container 210 and the transport platform 220 no foreign objects have entered, such as a hand, glove, helmet or tool. This monitoring may be based on that at least one of three detected lock pins 222 of the transport platform 220 a plane parallel to the transport platform 220 is determined. If any other surfaces or shapes protrude from this plane, detection of a foreign object can be performed and the lowering down can be interrupted. As an exception of this detection of a foreign object can be held the detected lock pins 222 and optionally also other surfaces or shapes protruding at other pin holes 810 of the container 210. For detecting a foreign object, shapes suited for a point cloud library (PCL) suited for shape detection can be used.

In addition to objects remaining in the gap it may be monitored that the gap diminishes expectedly on lowering down the container 210 onto the transport platform 220. If the gap does not, however, diminish and/or if the transport platform 220 begins to descend the gap staying significantly unchanged (with at most 10% change compared to vertical distance with which the container 210 has been attempted to lower), the lowering of the container 210 can be interrupted for a potential object remaining in the gap. The object may end up to the gap also stuck to a bottom of the container 210. For example, on the bottom of a container 210 transported by a truck trailer may have accrued a significant layer of ice that may have fitted within a body frame of a liquid container during storage.

In the optical detection equipment 100, various different types of sensors can be used, out of which as examples it is mentioned an Innoviz Lidar sensor InnovizPro™, IFM Time-of-Flight camera O3D301 and SICK stereo camera Visionary-B 3D.

The foregoing description has provided by way of non-limiting examples of particular implementations. It is clear to a person skilled in the art that the invention is not restricted to details presented in the foregoing, but that the invention can be implemented in other equivalent ways.

Some of the features of the presented embodiments may be used to advantage without the corresponding use of other features. As such, the foregoing description shall be considered as merely illustrative of the principles of the present disclosure, and not in limitation thereof. Hence, the scope of the disclosed embodiments are only restricted by the appended patent claims.

The invention claimed is:

1. A method comprising:
monitoring a container transfer device while lowering a container onto a transport platform, comprising automatically:
monitoring by fixedly mounted optical detection equipment a measurement zone ($mc_1+mc_2+mc_3+mc_4$) defined by one or more beams;
wherein the measurement zone ($mc_1+mc_2+mc_3+mc_4$) comprises at least two locking pins of a transport platform at a loading place and space above the transport platform;
automatically detecting by the same optical detection equipment:
a position of the at least two locking pins; and a position of the container at the measurement zone ($mc_1+mc_2+mc_3+mc_4$); the method further comprising:

automatically determining, based on the detected position of the at least two locking pins and based on the detected position of the container, a relative position of pin holes of the container and the at least two locking pins of the transport platform.

2. The method of claim 1, wherein the relative position of the container and the at least two locking pins is detected with the optical detection equipment on lowering the container onto the transport platform.

3. The method of claim 1, wherein based on relative positions of the pin holes and the at least two locking pins of the transport platform, the container transfer device is correspondingly automatically controlled to transfer the container onto the transport platform aligning the pin holes with the at least two locking pins.

4. The method of claim 1, wherein on lowering the container onto the transport platform, the position of the at least two locking pins is monitored by the optical detection equipment to observe longitudinal movement of the transport platform.

5. The method of claim 1, wherein by:
receiving comparison information about vertical information of the container; and
using the received comparison information for calibration of the detection equipment or for verifying a determination made with the optical detection equipment.

6. The optical detection equipment of claim 5, wherein most of the optical detection devices of the optical detection equipment are mounted at under 2.5 m height when measured at the top edge of the beam.

7. The optical detection equipment of claim 5, wherein the optical detection equipment is configured to form a discontinuous detection zone ($mc_1+mc_2+mc_3+mc_4$) with two or more optical detection devices such that some of the at least two locking pins can arrive at the measurement zone ($mc_1+mc_2+mc_3+mc_4$) or leave the measurement zone ($mc_1+mc_2+mc_3+mc_4$) on longitudinally moving the transport platform.

8. An optical detection equipment for monitoring a container transfer device, wherein the optical detection equipment is fixedly mounted and comprises:
one or more optical detection devices;
at least one processor; and computer program code, wherein the computer program code is arranged to cause, when said at least one processor executes the program code that a method of claim 1 is performed.

9. The optical detection equipment of claim 8, wherein the optical detection equipment is fixedly mounted such that a centerline of the measurement zone ($mc_1+mc_2+mc_3+mc_4$) resides obliquely downwards from the optical measurement equipment more in a horizontal than in vertical direction.

10. A method for monitoring a transfer device on lifting a container away from the transport platform, comprising automatically:
monitoring by fixedly mounted optical detection equipment, a measurement zone defined by one or more beams, which measurement zone ($mc_1+mc_2+mc_3+mc_4$) comprises at least two locking pins of a transport platform at a loading place and space above the transport platform;
detecting by the optical detection equipment an initial position of the container before removal of the container from the transport platform;
automatically determining, based on the initial position of the container, an initial position of the at least two locking pins of the transport platform which correspond to the pin holes of the container; and
automatically verifying using the optical detection equipment that said at least two locking pins in question become visible underneath the container as an indication that the at least two locking pins of the transport platform, which correspond to the pin holes of the container, do detach from the pin holes of the container.

11. The method of claim 10, wherein by:
automatically interrupting said lifting of the container if said verifying fails.

12. The method of claim 10, wherein the lifting of the container is interrupted unless lock pins of a long side closer to the optical detection equipment become visible on lifting the container from the initial position thereof by a first distance.

13. The method of claim 12, wherein the lifting of the container is interrupted unless lock pins of the long side farther away from the optical detection equipment become visible on lifting the container by a second distance that is greater than the first distance.

* * * * *